(12) United States Patent
Thomas et al.

(10) Patent No.: US 6,729,464 B2
(45) Date of Patent: May 4, 2004

(54) MINE CONVEYING SYSTEM

(75) Inventors: Terry M. Thomas, Franklin, PA (US); Thomas A Schwabenbauer, Cranberry, PA (US); Lynn N. Wheatcraft, Slippery Rock, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 10/136,014

(22) Filed: Apr. 30, 2002

(65) Prior Publication Data

US 2003/0201151 A1 Oct. 30, 2003

(51) Int. Cl.[7] .................. B65G 15/26; B65G 17/28; B65G 21/10; B65G 21/14; B65G 37/00
(52) U.S. Cl. .............. 198/594; 198/312; 198/861.1
(58) Field of Search ................ 198/594, 312, 198/314, 315, 303, 861.1, 592, 812

(56) References Cited

U.S. PATENT DOCUMENTS

| | | | |
|---|---|---|---|
| 4,798,279 A | 1/1989 | Doerr | |
| 4,865,185 A | 9/1989 | Bodimer | |
| 4,969,691 A | 11/1990 | Moore | |
| 4,986,412 A | 1/1991 | Brais | |
| 5,190,352 A | 3/1993 | LeBegue | |
| 5,246,274 A | 9/1993 | Smith | |
| 5,348,130 A | 9/1994 | Thomas | |
| 5,634,545 A * | 6/1997 | Plumley | 198/303 |
| 5,938,004 A * | 8/1999 | Roberts et al. | 198/812 |
| 6,360,876 B1 * | 3/2002 | Nohl et al. | 198/588 |

* cited by examiner

*Primary Examiner*—Gene O. Crawford
(74) *Attorney, Agent, or Firm*—James Earl Lowe, Jr.

(57) ABSTRACT

A conveying system for receiving and conveying material from a mobile material transporter adapted for travel on a floor, the conveying system comprising a main conveyor on the floor, and a main conveyor extension on the floor and having an upper surface. The main conveyor extension comprises a plurality of interconnected frame units, and means for supporting an endless conveyor belt on the interconnected frame units. The conveying system further includes an auxiliary conveyor in contact with and moveable over at least a part of the main conveyor extension upper surface. The auxiliary conveyor comprises a plurality of interconnected frame units identical to the frame units used in the main conveyor extension, means for supporting an endless conveyor belt on the auxiliary conveyor interconnected frame units, and means for driving the endless conveyor belt.

8 Claims, 7 Drawing Sheets

MINE CONVEYING SYSTEM

BACKGROUND OF THE INVENTION

The present invention relates to conveying apparatus and, more particularly, is directed to auxiliary conveying apparatus for use in connection with mobile haulage for conveying mined ore from a continuous mining machine.

In mining operations, especially in the underground mining of coal and the like, a variety of conveyors are used to transport the mined materials from the mining machine to their ultimate transportation location. During the early stages of mine development, main haulageways are created within the mine to accommodate stationary main belt conveyors that ultimately transport the mined ore from the mine or to remote collection areas. A variety of different conveying systems and apparatuses have been developed for transferring the mined material from the mining machine to the main belt conveyors.

One type of conveying apparatus commonly used to convey mined material from the mining machine to a main conveyor is a mobile articulated conveyor. Mobile articulated conveyors, such as the one disclosed in U.S. Pat. No. 4,852,724 to Bodimer, can move under self-propulsion along mine roadways and around corners while receiving the mined ore directly from the mining machine and discharging it onto the main conveyor or onto a separate stationary "panel" conveyor arranged for discharge onto the main conveyor.

A number of different auxiliary conveying apparatuses exist for transferring the mined material from the discharge of the mobile articulated conveyor to a stationary panel conveyor or main conveyor. For example, in one conveyor arrangement, the discharge end of the mobile conveyor is arranged to tram beside the stationary main or panel conveyor and a third "bridge" conveyor is employed to transfer the mined ore from the mobile conveyor to the stationary conveyor.

In another conveyor arrangement, the mobile articulated conveyor is trammed onto an elevated roadway that is mounted above an attending stationary panel or main conveyor belt for discharge thereupon. This conveyor arrangement eliminates the need for a bridge conveyor, and it is a typical practice in mining schemes having adequate overhead clearance to support such stacked arrangement of conveyors. However, to extend the conveying system, the mining process must be interrupted so that additional lengths of conveyor and elevated roadway can be added to the existing conveyor network.

One type of elevated discharge system that is particularly directed to minimizing the amount of time required to extend an elevated roadway and its accompanying conveying system is disclosed in U.S. Pat. No. 4,969,691 to Moore et al. That system comprises a floor mounted beltway that has an elevated roadway rollably attached thereto. The beltway comprises a series of interconnected frame units that rest on the mine floor and support a continuous conveyor belt. The elevated roadway has wheels that are captured in outboard rails attached to the beltway for movably supporting the roadway thereon. Lift cylinders are attached to the roadway for lifting the beltway from the mine floor so that the beltway can be winched forward by a winch attached to a track driven ramp. As the individual interconnected units of the beltway are pulled from the roadway structure, they are skidded across the mine floor towards the track driven ramp. Thereafter, the cylinders are retracted and the roadway is then rollably winched forward on the beltway so that the entire system is in position to receive and convey the mined material as it is discharged from the mobile conveyor that is supported thereon. Additional belt structure must also be added to the rear of the beltway so that the beltway can continue to discharge the mined material onto the main belt.

The elevated roadway and the beltway of Moore et al. are two independent structures that must be capable of supporting each other, in addition to supporting the mobile conveyor. They must therefore be constructed from heavy duty structural members. Such structural members are not only expensive, but they also add to the overall weight of the system thereby making the system more difficult to move and transport within the confines of a mine. Moreover, an expensive heavy duty track mounted tail piece must be used to advance the beltway and roadway forward. Such tail piece must be equipped with heavy duty rams that can be driven into the mine roof to solidly anchor the tail piece in position so that it will remain stationary as the heavy beltway and roadway are winched forward.

Also, a typical mine floor may contain depressions, cavities, holes, etc. and, thus, is usually not perfectly level. As discussed above, the Moore system has a plurality of lift cylinders attached thereto for engaging the mine floor and lifting the beltway there from. If the portion of the mine floor under which one or more of the cylinders is situated is irregular or has a cavity or depression therein, the cylinder may not, when fully extended, contact the bottom thereof thereby creating an unstable structure upon which the beltway is to be advanced.

An improvement to the Moore system is found in Thomas U.S. Pat. No. 5,348,130. As in the Moore system, however, the '130 system still requires a roadway that must be elevated above a trackway, and must be hefty enough to support a mobile conveying apparatus on the roadway. Further, having the mobile conveying apparatus travel over the roadway increases the height of the overall system.

There is a further need for a conveying system that can be constructed from relatively lightweight materials so that heavy duty and expensive equipment is not required to transport the components thereof and advance the system forward.

There is yet another need for an conveying system that can be safely used on irregular support surfaces such as mine floors.

There is still another need for an conveying system that can be advanced with a minimal amount of interruption to the mining process.

SUMMARY OF THE INVENTION

Accordingly, it is an object of the present invention to provide a conveying apparatus for use in connection with mobile conveying apparatuses that does not include structure that may interfere with and possibly divert the flow of material as it is being received from the mobile conveying apparatus.

It is another object of the present invention to provide a conveying system that can be constructed from relatively lightweight structural components so that heavy duty and expensive apparatus is not needed to transport the system's components or advance the system forward in a predetermined direction.

Yet another object of the present invention is to provide a conveyor system that can be safely used on irregular support surfaces such as mine floors.

Still another object of the present invention is to provide a conveying system that can be advanced with a minimal amount of downtime.

The present invention is a conveying system for receiving and conveying material from a mobile material transporter adapted for travel on a floor, the conveying system comprising a main conveyor on the floor, and a main conveyor extension on the floor and having an upper surface. The main conveyor extension comprises a plurality of interconnected frame units, and means for supporting an endless conveyor belt on the interconnected frame units. The conveying system further includes an auxiliary conveyor in contact with and moveable over at least a part of the main conveyor extension upper surface. The auxiliary conveyor comprises a plurality of interconnected frame units identical to the frame units used in the main conveyor extension, means for supporting an endless conveyor belt on the auxiliary conveyor interconnected frame units, and means for driving the endless conveyor belt.

In a preferred embodiment, the auxiliary conveyor further includes means facilitating movement of the auxiliary conveyor over the main conveyor extension, the facilitating means comprising the main conveyor upper surface comprising a plurality of roller assemblies spaced apart along the plurality of main conveyor extension interconnected frame units.

In a preferred embodiment, the conveying system further includes an inclined transition extension extending from one end of the main conveyor extension, the top of the inclined transition extension extending from the location of the main conveyor upper surface to the floor, a moveable articulated conveyor system, and a bridge conveyor extending from the discharge end of the moveable articulated conveyor to a point over the auxiliary conveyor.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as is limiting terms.

DETAILED DESCRIPTION OF A PREFERRED EMBODIMENT OF THE INVENTION

Figure 1:
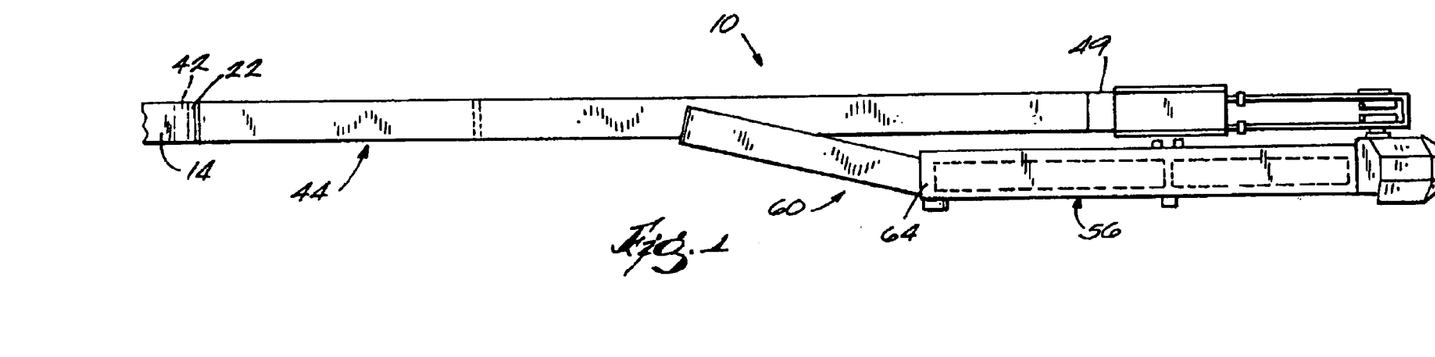
FIG. 1 is a top schematic view of the conveying system of this invention, including a main mine panel belt or conveyor, a main conveyor extension, an inclined transition extension, an auxiliary conveyor moveable over the top of the main conveyor extension, a self-propelled moveable articulated conveyor system, and a bridge conveyor extending between the discharge end of the moveable articulated conveyor and the auxiliary conveyor.

As shown schematically in FIG. 1, the invention is a conveying system 10 for receiving and conveying material from a mobile material transporter adapted for travel on a floor. The conveying system includes a main mine panel belt or conveyor 14 on the floor of the mine. As noted in the background of the invention, such main conveyors 14 are conventional and are used to transport the mined ore from the mine. Normally, the main conveyor 14 moves the mined material along a fixed path. The main conveyor 14 has a terminal end at a fixed location for receiving the material being mined.

Further, as is conventional in the art, the main conveyor 14 includes means (not shown) for supporting an endless conveyor belt 18 (see FIG. 5) thereon. The conveyor belt does, however, include joints (not shown) that are separable so additional belt can be added when the main conveyor 14 needs to be lengthened.

Figure 2:
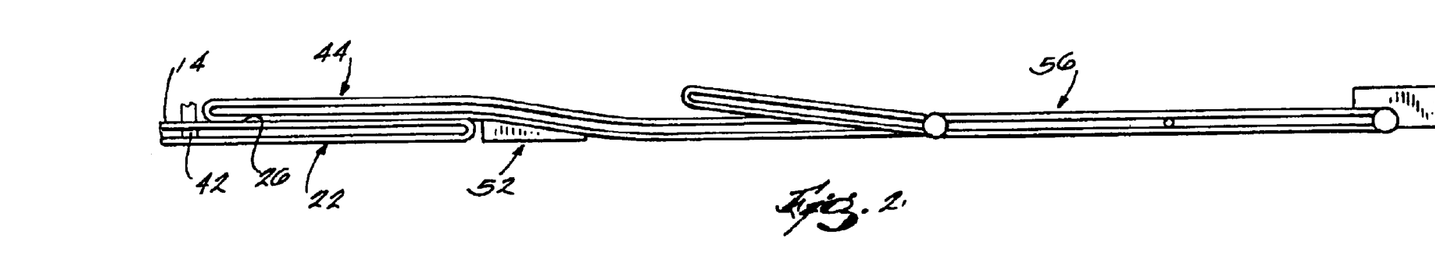
FIG. 2 is a side view of the conveying system shown in FIG. 1.
Figure 3:
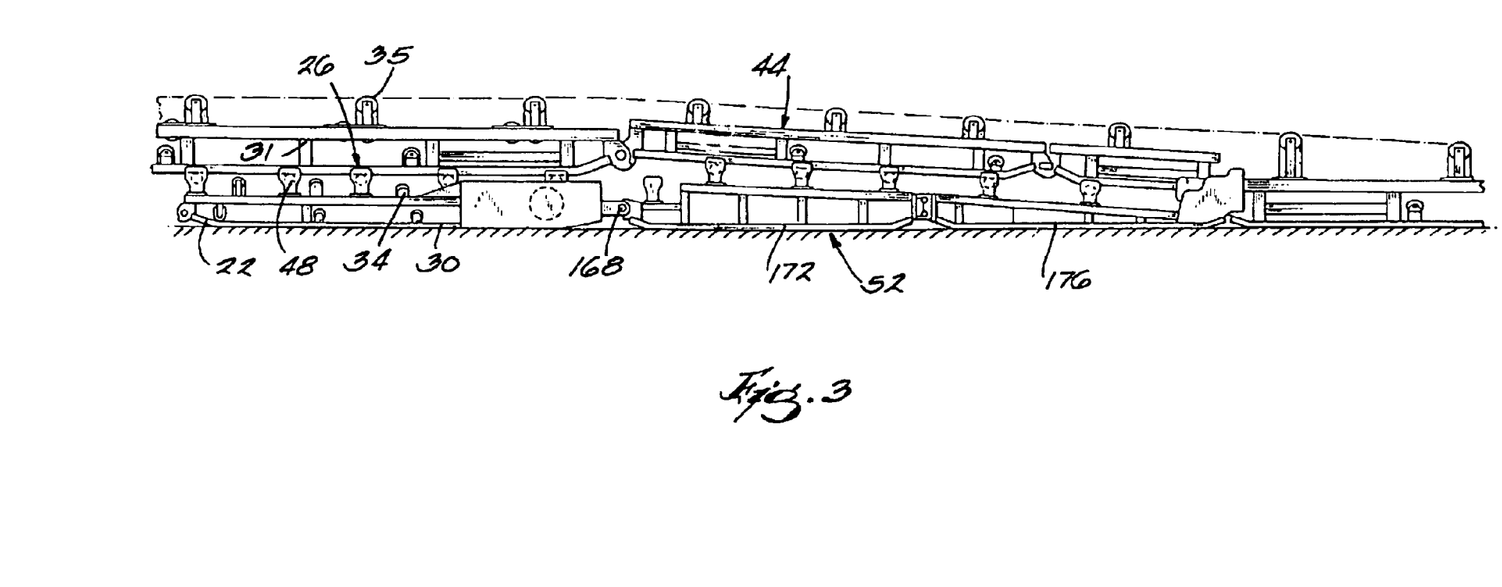
FIG. 3 is a side view of one of the interconnected frame units forming the main conveyor extension, three of the interconnected frame units forming the auxiliary conveyor, and a transition extension, all as shown in FIG. 1.
Figure 5:
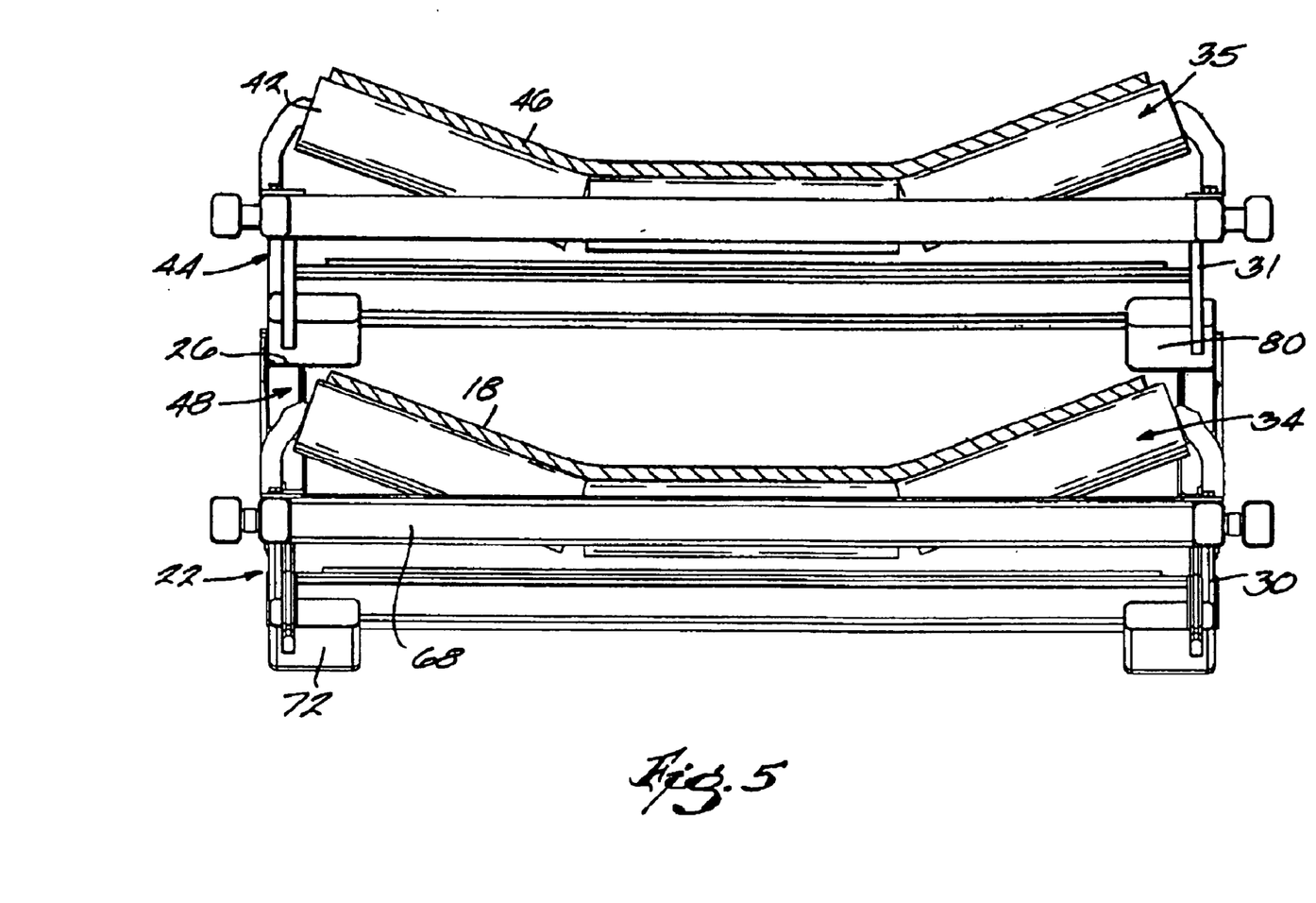
FIG. 5 is an end view of the frame units forming the main conveyor extension and the auxiliary conveyor, showing an auxiliary frame unit mounted upon roller assemblies above a main conveyor extension frame unit.
Figure 6:
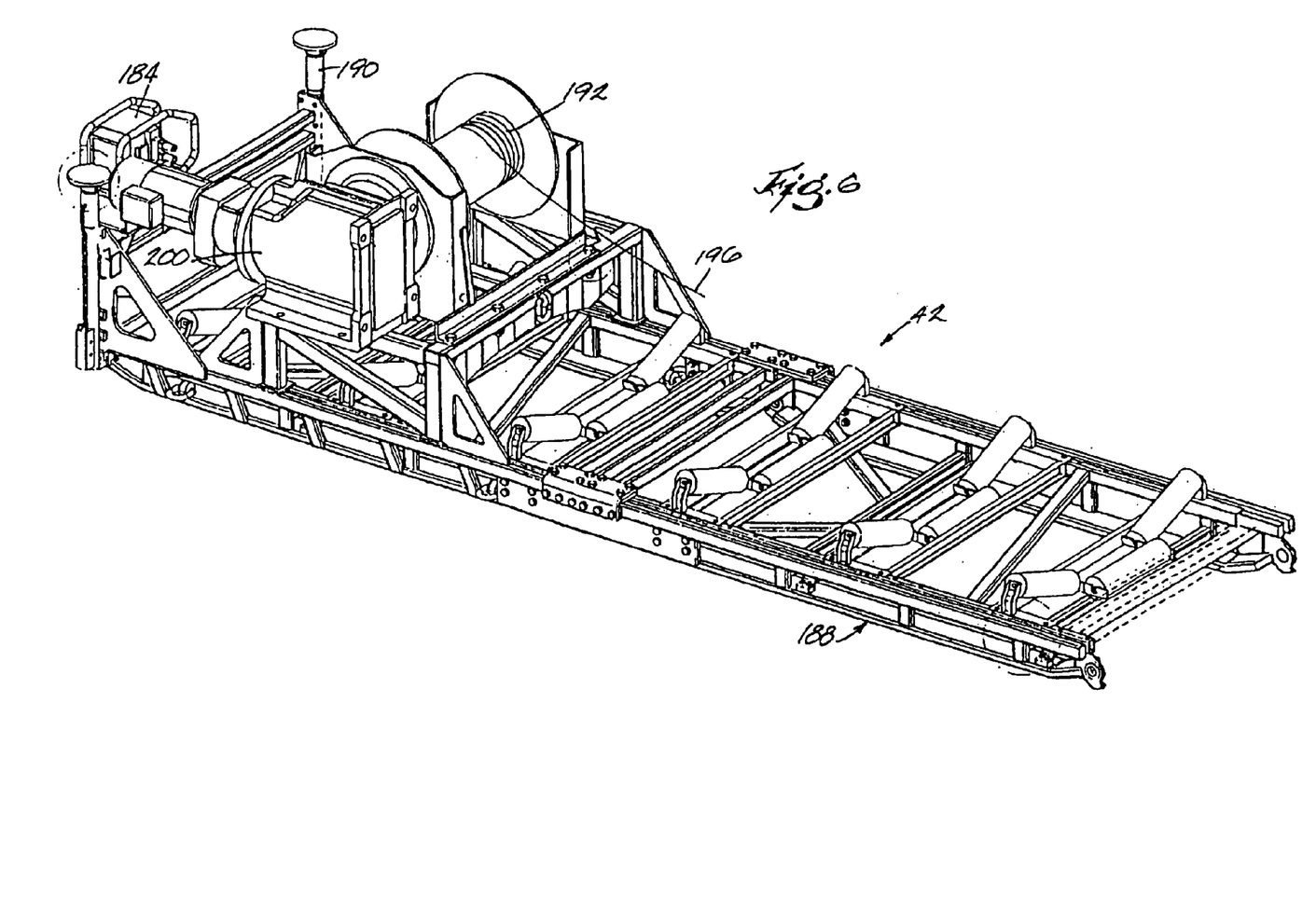
FIG. 6 is a prospective view of the tail section of the main conveyor extension. The tail section includes a winch assembly including a wire rope attached to the auxiliary conveyor for pulling the auxiliary conveyor back onto the main conveyor extension.

The conveying system 10 further includes a main conveyor extension 22 on the floor and having an upper surface 26. More particularly, as shown in FIG. 3, the main conveyor extension 22 comprises a plurality of pivotally interconnected frame units 30 (only one is shown in FIG. 3), means 34 (see FIG. 5) for supporting an endless conveyor belt 18 on the interconnected frame units 30, and, as shown in FIGS. 2 and 6, a tail section 42. Still more particularly, the main conveyor endless conveyor belt 18 is opened, extended and then reclosed so that it extends over the main conveyor 14 and the main conveyor extension 22. In other less preferred embodiments, the main conveyor 14 and main conveyor extension 22 can have separate belt systems, but then additional structure for dumping the coal from the main conveyor extension 22 on the main conveyor 14, as well as belt drives, would be needed.

As shown in FIG. 1, the conveying system 10 of this invention further includes an auxiliary conveyor 44 in contact with and moveable over at least a part of the main conveyor extension upper surface 26. The auxiliary conveyor 44 comprises, as shown in FIGS. 3 and 5, a plurality of the same kind of interconnected frame units 31 that form the main conveyor extension 22, similar means 35 for supporting an endless conveyor belt 46 on the frame units 31, and means in the form of a conventional belt drive 49 for driving the conveyor belt 46.

As shown in FIGS. 3, 4, 5, and 7, the conveying system 10 of this invention further includes means facilitating movement of the auxiliary conveyor 44 over the main conveyor extension upper surface 26, the facilitating means comprising the main conveyor upper surface 26 being in the form of a plurality of roller assemblies 48 spaced apart along the plurality of main conveyor extension interconnected frame units 30. The facilitating means also includes, as shown in FIG. 3, an inclined transition extension 52 extending from the main conveyor extension 22 end not adjacent the main conveyor, the top of the inclined transition extension 52 extending from the location of the main conveyor upper surface 26 to the floor.

As shown in FIG. 1, the conveying system 10 of this invention further includes a moveable articulated conveyor system 56, and a bridge conveyor 60 extending from the discharge end 64 of the moveable articulated conveyor 56 to a point over the auxiliary conveyor 44. More particularly, the bridge conveyor 60 is a conventional device used for receiving the material discharged from an articulated conveyor system and conveying the material over onto another conveyor. In other less preferred embodiments, other means, such as shuttle cars, can be used for bringing material to the auxiliary conveyor 44.

Figure 4:
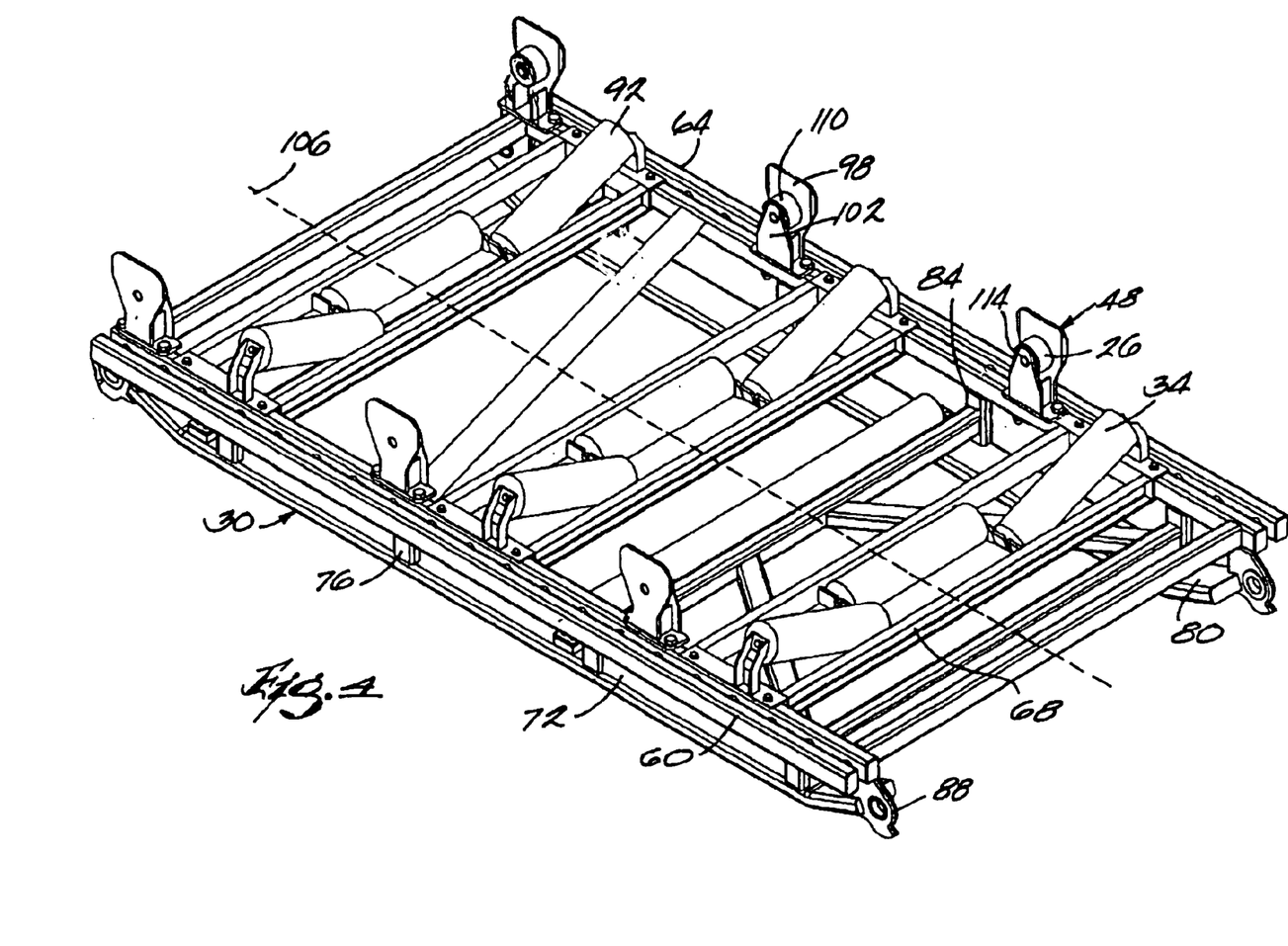
FIG. 4 is a prospective view of one of the interconnected frame units which form the main conveyor extension and the auxiliary conveyor.

Referring now to the main conveyor 22 and the main conveyor extension 44 in greater detail, the frame units 31 comprising the auxiliary conveyor 44 are identical to the interconnected frame units 30 used in the main conveyor extension 22. As shown in FIG. 4, each frame unit 30 comprises a left side rail 60, a right side rail 64, cross braces 68, a left skid pad 72 mounted on legs 76 under the left side rail 60 and a right skid pad 80 mounted on legs 84 under the right side rail 64. The skid pads 72 and 80 permit the frame unit 30 to be both supported on and pulled over the mine floor. The skid pads 72 and 80 also permit the frame unit 31 to move over the upper surface 26 of the main conveyor extension 22, as more particularly described below. In other less preferred embodiments, other means, such as wheels (not shown), for supporting and permitting movement of the frame units 30 and 31 can be used in place of the skid pads 72 and 80 and roller assemblies 48. Further, each frame unit 30 and 31 is pivotally connectable to its adjacent frame unit 30 and 31 at a pivot joint 88.

Although in FIGS. 1 and 2 the main conveyor 14, the main conveyor extension 22, and the auxiliary conveyor 44 are shown schematically as being relatively short, in practice the main conveyor 14 will usually extend in excess of hundreds of feet, and the main conveyor extension 22 and the auxiliary conveyor 44 will each be at least 300 to 400 feet long.

Each frame unit 30 and 31 further includes means for supporting an endless conveyor belt thereon. More particularly, conventional endless belt support rollers 92 are mounted on the side rails and the cross braces. The frame units 30 used in the main conveyor extension 22 differ from the frame units 31 used in the auxiliary conveyor 44 only by the addition of the plurality of auxiliary conveyor support roller assemblies 48.

Figure 7:
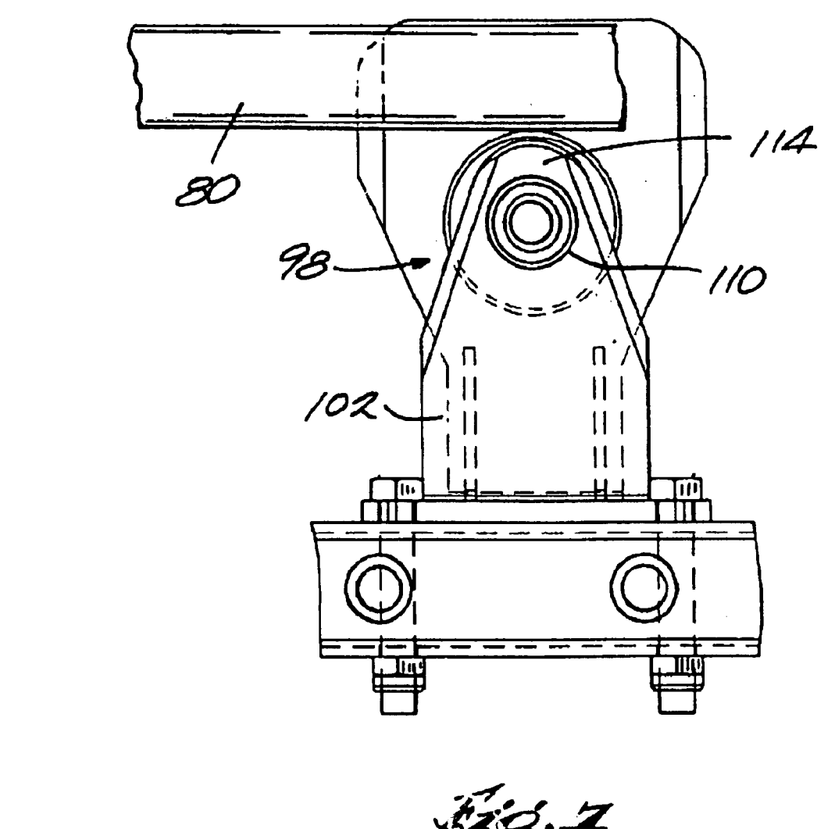
FIG. 7 is a side view of one of the roller assemblies shown in FIGS. 3 and 4.

More particularly, as shown in FIGS. 4 and 7, each support roller assembly 48 comprises a first vertically extending plate 98 attached to a side rail, a second vertically extending plate 102 attached to the side rail towards the frame unit center 106 and spaced apart from the first vertical plate 98, and a roller 110 rotatably mounted horizontally between the first plate 98 and second plate 102. The top 114 of the second plate 102 is located below the outer periphery of the roller 110 so that, when the auxiliary conveyor frame units 31 are on the main conveyor extension upper surface 26 provided by the rollers 110, the auxiliary conveyor frame units 31 can readily roll over the main conveyor extension 44.

Figure 8:
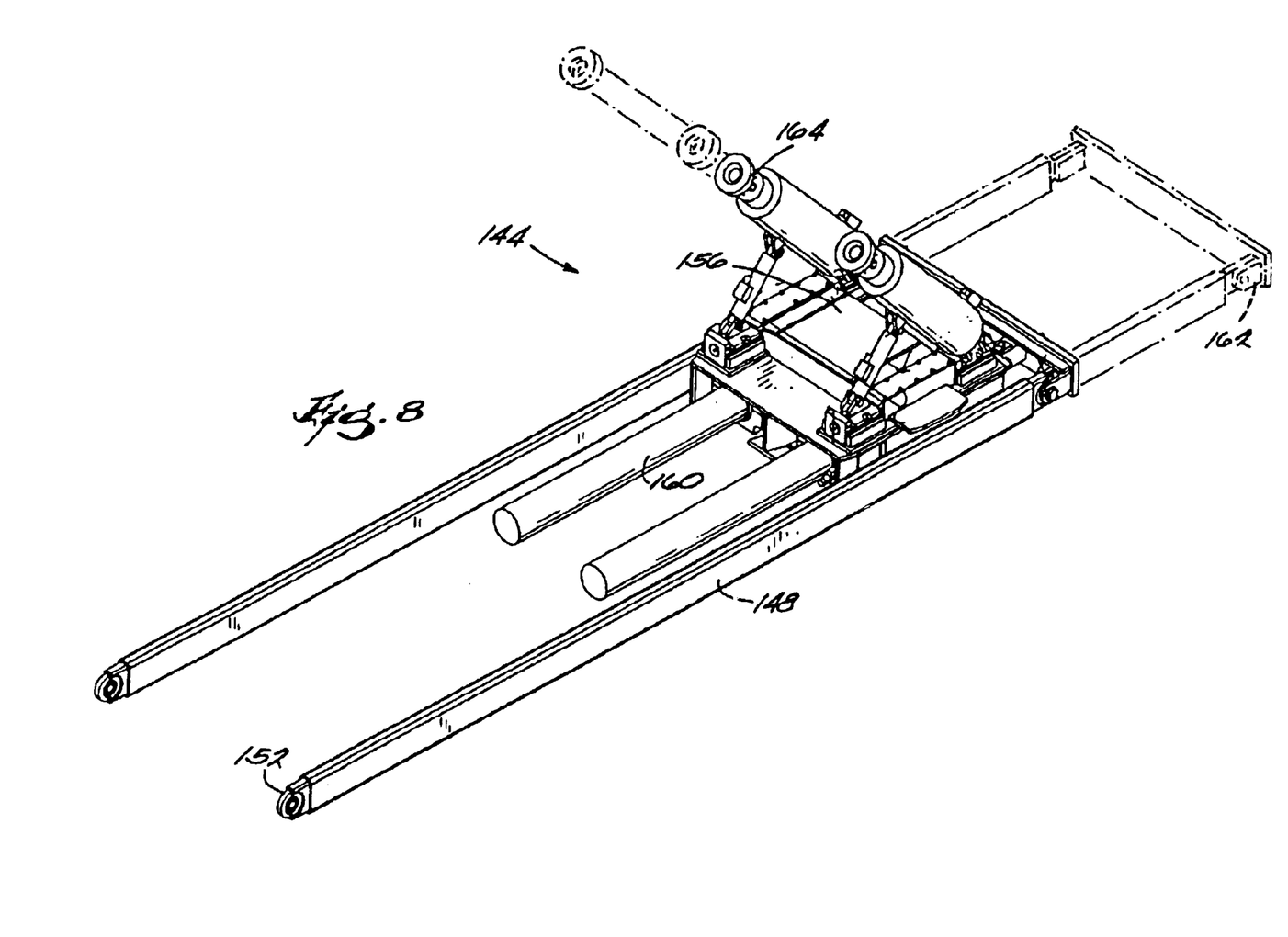
FIG. 8 is a perspective view of an advancing mechanism for advancing the auxiliary conveyor.

The conveying system 10 further includes means 144 for extending the conveying system 10 by moving the auxiliary conveyor 44 off of the main conveyor extension 22, and means 42 for retracting the conveying system 10 to facilitate movement of the entire conveying system 10 by moving the auxiliary conveyor 44 back onto the main conveyor extension 22. More particularly, the extending means 144 is in the form of an advancing mechanism comprising an extendable ramp device, as shown in FIG. 8. The ramp device 144, as is conventional in the art, includes hydraulicly extendable side rails 148 attachable at one end 152 to the forward end of the auxiliary conveyor 44, and a ramp section 156 mounted via hydraulic cylinders 160 to the other end 162 of the extendable side rails 148. The ramp section 156 further includes extendable cylinders 164 to clamp the ramp section 156 between the mine floor and the mine ceiling, so that when clamped between the mine floor and the mine ceiling, the ramp section 156 can push against the end of the extendable side rails 148, thereby pulling the auxiliary conveyor 44 towards the ramp section 156. In other embodiments, other means of pulling the auxiliary conveyor 44 off of the main conveyor extension 22, such as a tractor (not shown), can be used. A similar ramp device is disclosed in Thomas U.S. Pat. No. 5,348,130, which is incorporated herein by reference.

The conveying system 10 further includes means for supporting the auxiliary conveyor 44 as it leaves the upper surface 26 of the main conveyor extension 22. More particularly, as shown in FIG. 3, the supporting means comprises the inclined transition extension 52 pivotally connected at the end 168 of the main conveyor extension 44. Unlike the other frame units, this frame unit, made in two connected parts 172 and 176, has the spaced apart side rails extend from near the location of the side rails of the other frame units to a point just above floor level. The transition extension 52 thus supports the auxiliary conveyor 44 as it moves from on top of the main conveyor extension 22 to on the mine floor.

More particularly, the retracting means is in the form of the main conveyor extension tail section 42, as shown in FIG. 6. The tail section 42 is the frame unit adjacent the main conveyor 14. The tail section 42 includes essentially the same frame structure as the other frame units 30, except for the addition of a mechanism for pulling the auxiliary conveyor 44 back on top of the main conveyor extension 22. More particularly, the pulling mechanism is in the form of a winch assembly 180 including a power source, such as an electric motor 184, mounted on the tail section frame unit 188, hydraulic cylinders 190 on the tail section frame unit 188 extendable between the mine ceiling and floor, a winch drum 192 mounted on the tail section frame unit 188, a winch rope 196 around the drum 192 and connectable to the rear end of the auxiliary conveyor 44, and a transmission 200 extending between the power source and the winch drum 192 and mounted on the tail section frame unit 188.

As is now obvious in view of the above description, the auxiliary conveyor 44 constitutes a major advance over the art of extendable conveying systems. Unlike earlier systems, the overall conveyor system 10 is relatively light weight. Further, addition structure, other than the roller assemblies 26 in the preferred embodiment, for mounting the auxiliary conveyor 44 on the main conveyor extension 22 is not necessary. The conveying system 10 of the invention readily permits easy extension of the conveying system 10 into the mine as mine cutting progresses without the need to shut the conveying system 10 or to disassembly the conveying system in order to move the conveying system 10.

What is claimed is:

1. A conveying system for receiving and conveying material from a mobile material transporter adapted for travel on a floor comprising:

a main conveyor on the floor, a main conveyor extension on the floor and having an upper surface, the main conveyor extension comprising a plurality of interconnected frame units, and means for supporting an endless conveyor belt on the interconnected frame units, an auxiliary conveyor in contact with at least a part of said main conveyor extension upper surface, and moveable over the main conveyor extension upper surface, said auxiliary conveyor comprising a plurality of interconnected frame units, each auxiliary conveyor frame unit comprising a first side rail, a second side rail, cross braces connecting the first and second side rails, a first skid pad, a second skid pad, and means for attaching the skid pads to the side rails, and means in said auxiliary conveyor interconnected frame units for supporting an endless conveyor belt on said auxiliary conveyor interconnected frame units, and means for driving said auxiliary conveyor endless conveyor belt.

2. A conveying system in accordance with claim 1 wherein said conveying system further includes an inclined transition extension extending from one end of the main conveyor extension, the top of said inclined transition extension extending from the location of the main conveyor upper surface to the floor.

3. A conveying system in accordance with claim 1 wherein said conveying system further includes a moveable articulated conveyor system, and a bridge conveyor extending from the discharge end of the moveable articulated conveyor to a point over the auxiliary conveyor.

4. A conveying system in accordance with claim 1 wherein said auxiliary conveyor frame units are identical to the frame units used in the main conveyor extension.

5. A conveying system in accordance with claim 1 and further including a single endless conveyor belt on said main conveyor and said main conveyor extension.

6. A conveying system for receiving and conveying material from a mobile material transporter adapted for travel on a floor comprising:

a main conveyor on the floor, a main conveyor extension on the floor and having an upper surface, the main conveyor extension comprising a plurality of interconnected frame units, and means for supporting an endless conveyor belt on the interconnected frame units, an auxiliary conveyor in contact with at least a part of said main conveyor extension upper surface, and moveable over the main conveyor extension upper surface, said auxiliary conveyor comprising a plurality of interconnected frame units, means for supporting an endless conveyor belt on said auxiliary conveyor interconnected frame units, and means for driving said auxiliary conveyor endless conveyor belt, and means facilitating movement of the auxiliary conveyor over the main conveyor extension, said facilitating means comprising the main conveyor upper surface comprising a plurality of roller assemblies spaced apart along said plurality of main conveyor extension interconnected frame units.

7. A conveying system for receiving and conveying material from a mobile material transporter adapted for travel on a floor comprising:

a main conveyor on the floor, a main conveyor extension on the floor and having an upper surface, the main conveyor extension comprising a plurality of interconnected frame units, and means for supporting an endless conveyor belt on the interconnected frame units, an auxiliary conveyor in contact with at least a part of said main conveyor extension upper surface, and moveable over the main conveyor extension upper surface, said auxiliary conveyor comprising a plurality of interconnected frame units, means for supporting an endless conveyor belt on said auxiliary conveyor interconnected frame units, and means for driving said auxiliary conveyor endless conveyor belt, and said main conveyor extension further including a tail section comprising a tail frame unit, and a winch assembly mounted on the tail frame unit.

8. A conveying system for receiving and conveying material from a mobile transporter adapted for travel on a floor comprising:

a main conveyor on the floor, a main conveyor extension on the floor and having an upper surface, the main conveyor extension comprising a plurality of interconnected frame units, means for supporting an endless conveyor belt on the interconnected frame units, and a tail section comprising a tail frame unit, and a winch assembly mounted on the tail frame unit, an auxiliary conveyor in contact with at least a part of said main conveyor extension upper surface, and moveable over the main conveyor extension upper surface, said auxiliary conveyor comprising a plurality of interconnected frame units identical to the frame units used in the main conveyor extension, means for supporting an endless conveyor belt on said auxiliary conveyor interconnected frame units, and means for driving said endless conveyor belt, means facilitating movement of the auxiliary conveyor over the main conveyor extension, said facilitating means comprising the main conveyor upper surface comprising a plurality of roller assemblies spaced apart along said plurality of main conveyor extension interconnected frame units, an inclined transition extension extending from one end of the main conveyor extension, the top of said inclined transition extension extending from the location of the main conveyor upper surface to the floor, a moveable articulated conveyor system, and a bridge conveyor extending from the discharge end of the moveable articulated conveyor to a point over the auxiliary conveyor.

* * * * *